US008260956B2

(12) United States Patent
Reyhner et al.

(10) Patent No.: US 8,260,956 B2
(45) Date of Patent: Sep. 4, 2012

(54) DATA TRANSMISSION QUEUING USING FAULT PREDICTION

(75) Inventors: Marc D. Reyhner, Redmond, WA (US); Ian C. Jirka, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 12/048,218

(22) Filed: Mar. 14, 2008

(65) Prior Publication Data

US 2009/0234908 A1 Sep. 17, 2009

(51) Int. Cl.
*G06F 15/173* (2006.01)
(52) U.S. Cl. ........................................ 709/238; 709/223
(58) Field of Classification Search .................... 709/238
See application file for complete search history.

(56) References Cited

U.S. PATENT DOCUMENTS

| 6,449,255 | B1* | 9/2002 | Waclawsky | 370/236 |
|---|---|---|---|---|
| 6,480,500 | B1 | 11/2002 | Erimli et al. | |
| 6,633,835 | B1 | 10/2003 | Moran et al. | |
| 6,760,331 | B1 | 7/2004 | Moussavi et al. | |
| 7,061,861 | B1 | 6/2006 | Mekkittikul et al. | |
| 7,095,750 | B2 | 8/2006 | Craddock et al. | |
| 7,664,026 | B2* | 2/2010 | Huang et al. | 370/231 |
| 2004/0076161 | A1 | 4/2004 | Lavian et al. | |
| 2004/0120332 | A1* | 6/2004 | Hendel | 370/411 |
| 2005/0066241 | A1* | 3/2005 | Gross et al. | 714/48 |
| 2005/0089053 | A1 | 4/2005 | Zhu | |
| 2006/0045011 | A1 | 3/2006 | Aghvami et al. | |
| 2007/0041385 | A1* | 2/2007 | Sali et al. | 370/395.21 |
| 2008/0002572 | A1 | 1/2008 | Engbersen et al. | |
| 2008/0002822 | A1* | 1/2008 | Petrovykh | 379/265.11 |
| 2009/0044013 | A1* | 2/2009 | Zhu et al. | 713/170 |

OTHER PUBLICATIONS

NNRD454141. "Put With Wait for a queued messaging system." IBM Technical Disclosure Bulletin. Feb. 1, 2002. UK. Issue 454, pp. 308. 4 pages.*
Handley et al. RFC 2861. "TCP Congestion Window Validation." The Internet Society, Jun. 2000. 11 pages.*
Bozinovski, Marjan et al. "Maximum Availability Server Selection Policy for Efficient and Reliable Session Control Systems." IEEE/ACM Transactions on Networking. vol. 15, No. 2. Apr. 2007. 387-399.*
Kunniyur, et al., "An Adaptive Virtual Queue (AVQ) Algorithm for Active Queue Management", IEEE/ACM Transactions on Networking (TON), vol. 12, Issue 2 (Apr. 2004), Year of Publication: 2004, pp. 286-299.
Lakshmikantha, et al., "Robustness of Real and Virtual Queue-Based Active Queue Management Schemes", IEEE/ACM Transactions on Networking (TON), vol. 13, Issue 1 (Feb. 2005), Year of Publication: 2005, pp. 81-93.
"Microsoft® System Center Operations Manager 2007," Dec. 18, 2006, 10 pages.

* cited by examiner

*Primary Examiner* — Jeffrey R Swearingen
(74) *Attorney, Agent, or Firm* — Toler Law Group, PC (57) ABSTRACT

In a distributed computer system, data to be communicated is assigned to one of a plurality of virtual queues. The plurality of virtual queues includes a first representative virtual queue associated with a first fault group and a second representative virtual queue associated with a second fault group. The data to be communicated is assigned to one of the plurality of virtual queues prior to transmission based on fault group information associated with the data.

17 Claims, 7 Drawing Sheets

DATA TRANSMISSION QUEUING USING FAULT PREDICTION

BACKGROUND

With distributed computer systems and other types of computer systems that use more than a single computer, a source computer often sends data to a receiving computer. Data to be communicated is often stored in a queue, such as a data buffer. The data may be retrieved from the queue and communicated from the source computer to the receiving computer. One type of queue used with such systems is a priority queue where data is stored in an order that is based on a priority of transmission. Higher priority data from the queue is communicated before lower priority data. The priority of the data may be associated with a type or class of the data. An examplary method of determining a class of data is based on a destination or usage of the data.

When a certain class or type of data in a queue of a sending computer has a high priority for transmission, but where the particular class or type of data cannot be processed at a receiving computer, lower priority data of a different class or type to be communicated from the queue of the sending computer may be blocked. As an example, if a certain type of data is unable to be processed, such as where a particular type of data processing component at the receiving computer is out of service (e.g. when one type of database is disabled or is otherwise not operational), an entire stream of data flow over the connection from the sending computer to the receiving computer would stall. In this example, lower priority data that is not related to the out of service condition of a particular receiver component is blocked as well as the affected data. This situation can become more serious in large systems where multiple data communication hops are involved since the data blockage may further propagate upstream from the original data blockage and affect multiple computer systems and their communication queues.

SUMMARY

Data to be communicated from a source computer to a receiving computer is assigned to at least one of a plurality of virtual queues. A virtual queue is a data structure that may be used to organize data that shares a common data buffer. Data may be assigned to a particular virtual queue by adding a pointer to the data buffer to a selected linked list associated with the assigned virtual queue. Data is allocated to a selected virtual queue based on a fault group of the data. Generally, different data items that are associated with a similar fault prediction grouping, such as a common fault group, may be predicted to fail together, and therefore are assigned to a common virtual queue. As such, when a particular type of data associated with a predicted fault pattern can not be processed by a receiving computer, the particular virtual queue associated with the fault can be blocked or marked as having a lower priority or a lowest priority, so that other types of data in other virtual queues can still be processed and communicated without being affected by the particular detected fault. The fault group allocation of data may be determined based on historical or predicted fault information associated with data processing and handling of data at a receiving computer system. For example, data to be communicated over a communication link to a first receiving computer may have a different fault group than data to be communicated to a second receiving computer. Data may be allocated to a particular fault group and assigned to a selected virtual queue based on a variety of criteria, such as a particular data allocation rule, a distributed processing rule, or an attribute of the data, such as a particular destination or a particular usage of the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
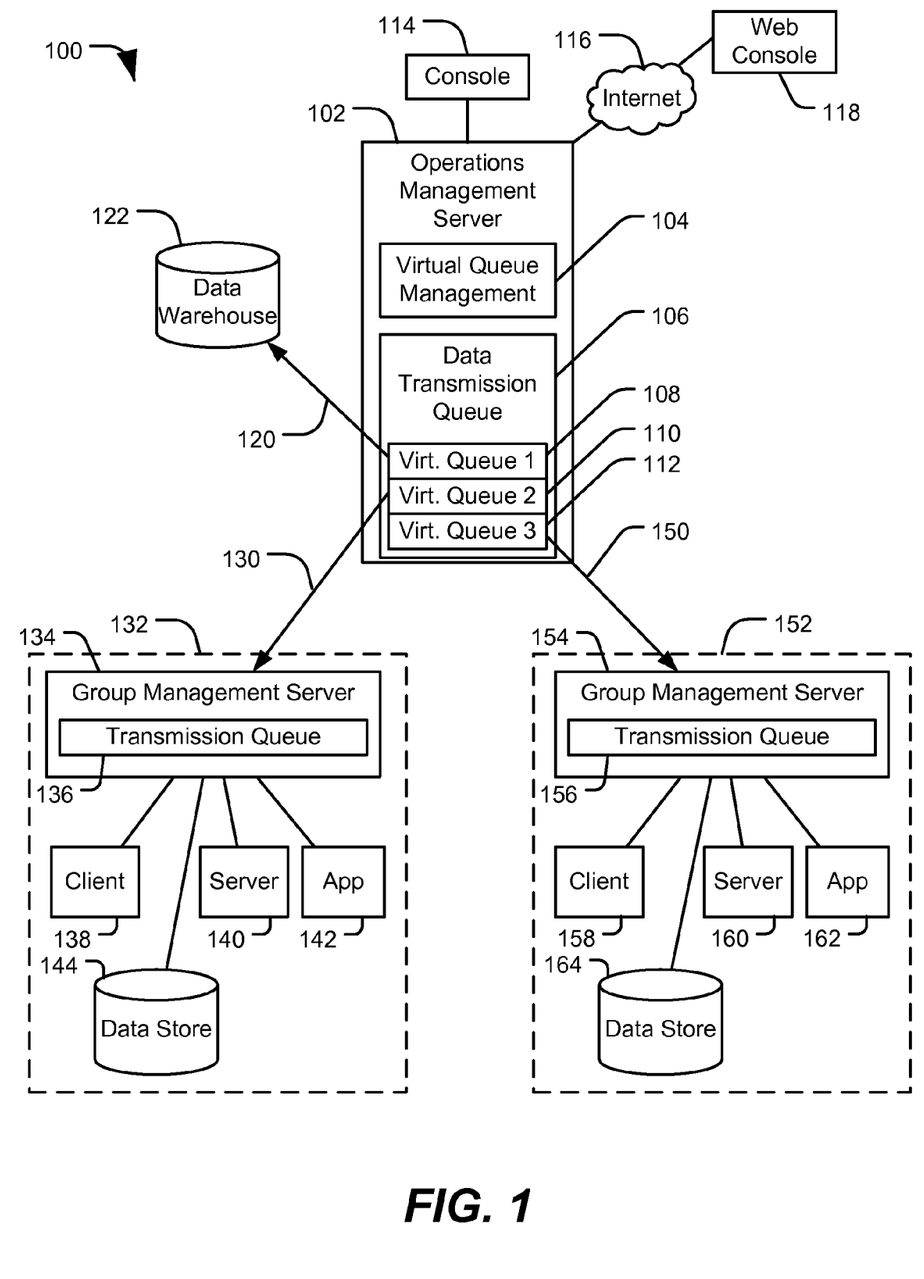
FIG. 1 is a block diagram of a particular embodiment of a distributed computer system.

A particular illustrative example of a distributed computing system that may include at least one source computer that allocates data into virtual queues is shown in FIG. 1. The computing system of FIG. 1 illustrates an operations management implementation that utilizes a data transmission technique where data is allocated to virtual queues based on fault group information.

Referring to the exemplary system of FIG. 1, a distributed computing system 100 includes an operations management server 102. The system 100 also includes a first representative system 132 and a second representative system 152 that are in communication with the operations management server 102 via communication channels 130 and 150, respectively. The operations management server 102 is coupled to a display console 114 and to a representative data storage area, such as a data warehouse 122. The operations management server 102 is also coupled via the Internet 116 to a web console 118. The operations management server 102 includes a virtual queue management module 104 and a data transmission queue 106. The virtual queue management module 104 controls assignment of data to virtual queues based on fault prediction. Each of the virtual queues is associated with a particular fault group. The data transmission queue 106 includes a plurality of virtual queues, such as illustrated by a first virtual queue 108, a second virtual queue 110, and a third virtual queue 112. While three virtual queues are shown in FIG. 1 for illustration purposes, it should be understood that the data transmission queue 106 may include any number of virtual queues and the virtual queues may be created or deleted dynamically.

The first representative system 132 in communication with the operations management server 102 includes a first group management server 134 that includes a transmission queue 136. The first group management server 134 is operable to manage or monitor activity of other computing elements. The first group management server 134 is coupled to a plurality of representative computer system elements, such as a client 138, a data store 144, a computer server 140, and one or more computer applications 142. Similarly, a second group management server 154 within the second representative system 152 includes a second transmission queue 156. The second group management server 154 is coupled to a plurality of devices, such as a client device 158, a data store 164, a computer server 160, and an application 162.

During operation, the operations management server 102 may perform service monitoring of an information technology environment including monitoring of other servers such as the servers 140 and 160, clients such as clients 138 and 158, and/or applications such as applications 142 and 162. The operations management server 102 may perform monitoring of various events and provide reports and alarms of detected error conditions and status conditions. The operations management server 102 may also report status conditions and perform audit collection of data system components. In addition, one or more of the communication channels 130 and 150 used to communicate data allocated to the virtual queues 108, 110, and 112 may include a secure connection and the data that is communicated may be encrypted prior to transmission. The operations management server 102 may provide operations management features as well as administrative and network management functions using the display console 114 and the web console 118 for display to a user. In addition, the operations management server 102 and the display console 114 may restrict functionality based on detection of a particular class of user.

During operation, when data is received or otherwise accessed and is to be communicated from the operations management server 102 to another system element, such as to a receiving computer system 132 or 152, the data is assigned to at least one of the plurality of virtual queues, or to a newly-created virtual queue. The data is allocated to a selected virtual queue based on a fault group of the data. The virtual queue management module 104 includes logic or instructions executable to make assignments of data to a selected virtual queue based on a fault group of the data. Generally, different data items that are associated with a similar fault prediction grouping, such as data having a common fault group, may be predicted to fail together, and therefore are assigned to a common virtual queue. In an illustrative embodiment, data items that are associated with a particular rule, such as a representative rule (e.g., Rule 1) would each be assigned to the same virtual queue such as to the virtual queue 108. Similarly, in this example, data items that are associated with a second rule (e.g., Rule 2) would then be assigned to a second common virtual queue, such as the virtual queue 110.

The fault group allocation of data may be determined based on historical or predicted fault information associated with data processing and handling of data at a receiving computer. For example, data to be communicated over the communication link 130 to the first group management server 134 may have a different fault group than data to be communicated over the second communication link 150 to the second group management server 154. Allocating data based on a particular data allocation rule, distributed processing rule, or based on a data attribute, such as a particular destination, is one of many methods of allocating data associated with a particular fault group. In addition to the above data allocation methods, the virtual queue management module 104 may use alternative methods and techniques for allocating data to one of a plurality of virtual queues based on fault group information.

While the particular embodiment of FIG. 1 references an operations management system environment, it should be understood that the fault group based data allocation methods described are applicable to many other environments, such as data communication systems using message buses, data transports, and media streaming.

Figure 2:
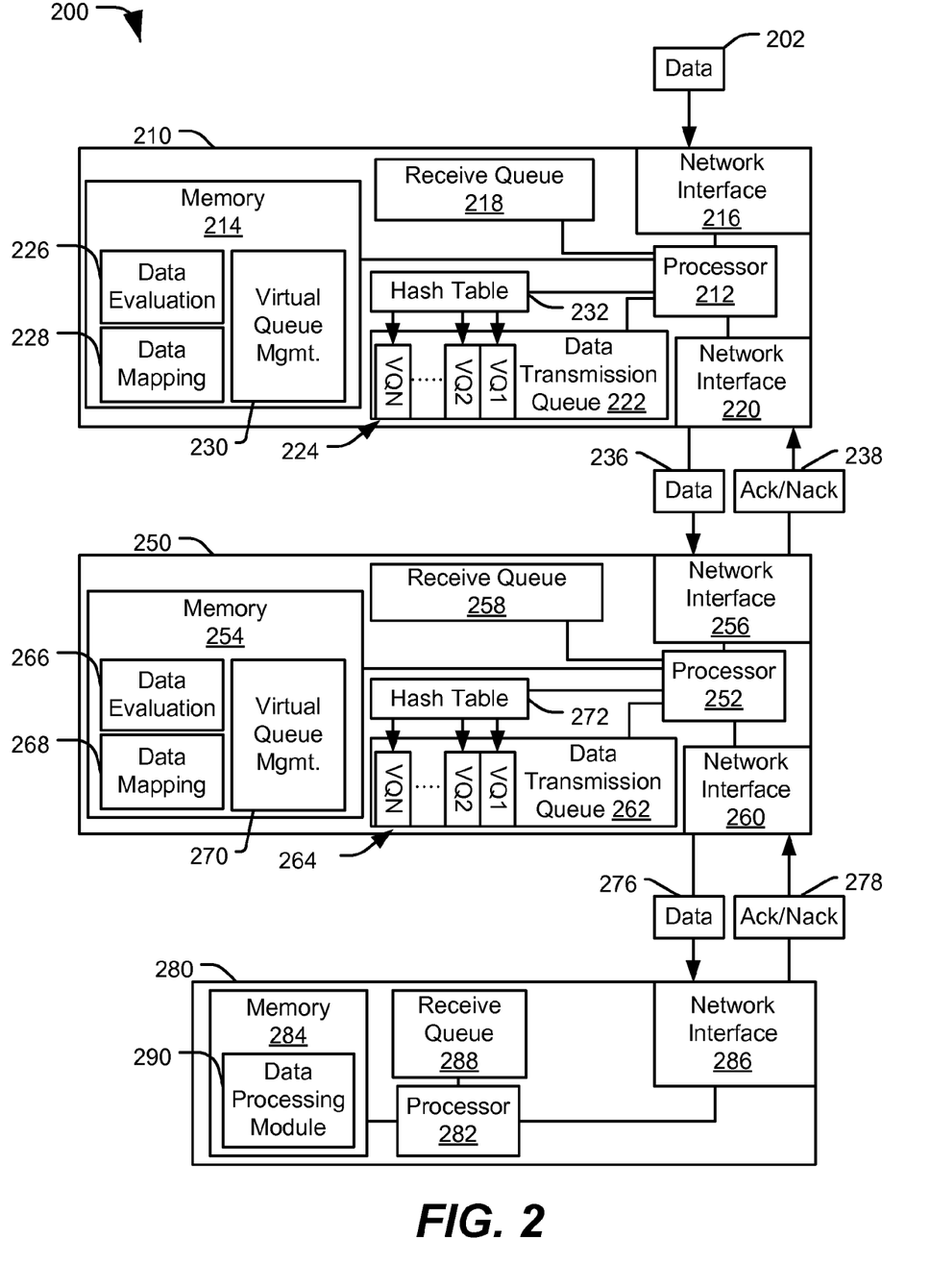
FIG. 2 is a block diagram of a particular embodiment of a multi-hop computer system.

Methods of using fault group based allocation of data to virtual queues may also be performed in other environments, such as a multi-hop computer system environment. Referring to FIG. 2, a particular non-limiting and illustrative embodiment of a multi-hop distributed computer system 200 is shown. The multi-hop distributed computer system 200 includes a first computer system 210, a second computer system 250, and a third computer system 280. While only three computer systems are shown for ease of illustration, it should be understood that the multi-hop distributed computer system 200 may include more than three computer systems. The first computer system 210 includes a network interface 216 to receive data 202 that may include one or more data items to be communicated to other computer systems. The first computer system 210 also includes a receive queue 218, a processor 212, and a second network interface 220. The first computer system 210 further includes a data transmission queue 222 having a plurality of representative virtual queues 224. In a particular embodiment, a hash table 232 is accessible to the processor 212 and is used to provide hash data to the data transmission queue 222. The first computer system 210 also includes a computer memory 214 that includes program logic, such as one or more computer programs, including a virtual queue management module 230, a data evaluation module 226, and a data mapping module 228. The data evaluation module 226 is executable by the processor 212 to evaluate the data 202 to identify a particular data criteria, such as a fault group criteria. The data mapping module 228 is executable by the processor 212 to map the data criteria to an index value into one of the plurality of virtual queues 224. The index value may identify data having a similar fault prediction grouping or a common fault group. In one embodiment, the common fault group is determined based on a Rule ID of a rule applicable to the received data 202. Alternatively, data may be allocated based on a particular data allocation rule, a distributed processing rule, or based on a data attribute, such as a particular destination, or the data may be allocated using any other method of allocating data associated with a particular fault group. The virtual queue management module 230 is executable by the processor 212 to allocate data to be communicated to one of the plurality of virtual queues 224, or to create a new virtual queue, based on the index value.

During operation, the data 202 is received via the network interface 216 and is provided to the processor 212 for processing. The data 202 may also be stored within the memory 214. Data evaluation, at the data evaluation module 226, and data mapping, at 228, is performed on the received data 202. After performing data evaluation and data mapping, the virtual queue management module 230 uses the resulting evaluation data information and allocates the particular data item 202 to one of the plurality of virtual queues 224 within the data transmission queue 222, or dynamically creates a new virtual queue, based on the fault group of the data 202. An example of resulting evaluation data that is provided by the data evaluation module 226 and the data mapping module 228 is a rule identifier (Rule ID) that is associated with the received data 202. The Rule ID may be used by the virtual queue management module 230 to identify a fault group for the data 202 and to select a virtual queue for the data 202 based on the identified fault group. The virtual queue management module 230 provides a signal to the processor 212 that may take the form of a data signature. The data signature may be evaluated to identify the virtual queue data allocation. In a particular embodiment, the processor 212 receives the data signature and provides the data signature to the hash table 232, where the data signature is mapped to a hash value that is provided as an index value to the selected virtual queue within the plurality of virtual queues 224. While the hash table 232 is shown, it should be understood that the virtual queue management module 230 may provide a direct signal output or other indication to select one of the plurality of queues 224 without using a hash table.

Once the data 202 has been processed, evaluated, and allocated to a particular virtual queue 224, the data 202 is then ready to be communicated over the second network interface 220 to another system element, such as where data 236 is communicated to the second computer system 250. In a particular embodiment, the data 236 includes one or more data items and includes the data 202.

The second computer system 250 includes a network interface 256 to receive data and a second network interface 260 for data transmission. The network interface 256 is operable to receive the communicated data 236 and to provide a response signal, such as an acknowledge (ACK) or negative acknowledge (NACK) signal 238. The second computer system 250 includes a second processor 252, a second receive queue 258, a second hash table 272, and a second data transmission queue 262. The second data transmission queue 262 includes a second plurality of virtual queues 264. In addition, the second computer system 250 includes a second computer memory 254 coupled to the second processor 252. The second computer memory 254 includes program logic, such as one or more computer programs, including a second data evaluation module 266, a second data mapping module 268, and a second fault group based virtual queue management module 270.

During operation, the data item 236 is received via the network interface 256 and is forwarded to the second processor 252. The second processor 252 may queue the data 236 at the second receive queue 258 and may also communicate the received data item 236 to the second computer memory 254 for evaluation purposes. The data item 236 is evaluated at the second data evaluation logic module 266 and mapped at the second data mapping module 268. The processed data is then provided to the second fault group based virtual queue management module 270. The data 236, together with output from the second data evaluation module 266 and the second data mapping module 268, is then allocated by the second virtual queue management module 270 to at least one of the second plurality of virtual queues 264, or to a new virtual queue, in the data transmission queue 262. The second virtual queue management module 270 provides a second data signature output or another representative signal to the second processor 252 to indicate which virtual queue within the second plurality of virtual queues 264 to allocate the received data 236. In response, the second processor 252 provides an output to the second hash table 272 to convert the indication of the selected virtual queue (e.g., the second data signature) to a hash value that provides an index value to the selected virtual queue within the second set of virtual queues 264. While the second hash table 272 is shown, it should be understood that the second virtual queue management module 270 may provide a direct signal output or other indication to select one of the plurality of queues 264 without using a hash table.

After the data 236 is allocated to the selected virtual queue, the data 236 is then transmitted via the data transmission queue 262 and the second network interface 260 to a subsequent destination, such as to the third computer system 280.

The network interface 260 provides an interface to communicate the allocated data from each of the second plurality of virtual queues 264, illustrated as data 276, to the third computer system 280. In a particular embodiment, the data 276 may include one or more data items and includes the data 236.

The third computer system 280 includes a network interface 286 to receive the communicated data 276 and to provide a response signal such as an acknowledge (ACK) or negative acknowledge (NACK) signal 278. The third computer system 280 also includes a processor 282 with a data receive queue 288. The third computer system 280 further includes a memory 284 to store received data and includes a data processing module 290 that may include applications or computer programs to process the received data 276. For example, the processing module 290 may include program instructions that are executable by the processor 282.

When a particular receiving computer, such as the third computer system 280, detects a fault condition or a condition where the received data 276 may not be processed or properly received, the receiving computer may respond by providing a fault signal, such as a negative acknowledge (NACK) signal 278 to the upstream computer that transmitted the data 276, such as to the second computer system 250. The transmitting computer (i.e., the second computer system 250), in response to receiving the negative acknowledge (NACK) signal 278, evaluates the negative acknowledge signal 278 to determine that a fault condition has occurred. Upon detection of a fault condition, the second processor 252 within the second computer system 250 evaluates the received fault signal and identifies the particular virtual queue, such as one of the virtual queues 264, that is allocated to the data corresponding to the fault condition.

In a particular illustrative example, where the data 276 was allocated to the second virtual queue (VR2 in FIG. 2), the second processor 252 performs one of a plurality of available fault handling operations with respect to the second virtual queue. The second virtual queue may be de-prioritized or the second virtual queue may be marked as blocked or in a pause condition. In the situation where the second virtual queue is de-prioritized, the second virtual queue is then placed at a lower priority with respect to data transmission compared to the other virtual queues or the second virtual queue may be accessed less frequently than the other virtual queues in the data transmission scheme of the data transmission queue 262. As such, when a particular type of data associated with a predicted fault pattern can not be processed by a receiving computer, such as the third computer system 280, the particular virtual queue associated with the fault can be blocked or marked as having a lower priority or a lowest priority, so that other types of data in other virtual queues can still be processed and communicated without being affected by the particular detected fault.

In a particular illustrative example, a component within a receiving computer, such as a data warehouse, might be non-operational, such as where a customer disables the particular component. With the disclosed system, when a receive-side component goes down, such as the exemplary data warehouse, the virtual queues having data to be sent to the data warehouse are marked as blocked or as lower priority, but other data flow continues without interruption via other virtual queues. The system advantageously continues to communicate and process data flow for data that is unrelated to the particular fault event.

The operation of virtual queue de-prioritization, blocking or pausing may be changed after receiving a further signal 278 (e.g., an acknowledge or a fault clearance signal) to indicate that a fault condition has been remedied or has cleared. In a particular example, an acknowledge signal or other fault removal signal may be received at the network interface 260 to indicate a repair or a remedy of the fault condition. After detecting that the fault condition has been remedied or cleared, the affected virtual queue is then re-prioritized or un-blocked to resume processing in normal operation (i.e., operation as performed prior to the fault condition being detected).

In many implementations, data transmission or data transmission requests may be relayed through multiple hops of various computer systems, where each computer system has a distinct data queue, such as data transmission queues 222, 262, as shown in FIG. 2. In this case, a failure at any element in a transmission chain may affect the ability to process or relay a particular category of requests and can be used as an automatic and dynamic back pressure mechanism. For example, where a final receiving computer sends NACK signals, then an intermediate computer blocks or pauses further transmissions of data from the affected virtual queue. Thereafter, the affected virtual queue increases in size. After the affected virtual queue grows and eventually exceeds a size threshold, the intermediate computer begins to send NACK signals to an originating source computer. An example of a size threshold to indicate an overflow condition to trigger sending NACK signals is a size where one virtual queue exceeds eight percent (8%) of the total queue size for all virtual queues. Thus, where multi-hop systems are involved, proper allocation of data to particular virtual queues based on categories of predicted failures provides for enhanced dynamic data allocation and improved data communication and processing from an overall system perspective. In addition, a plurality of different categories of predicted errors may be determined and data may be classified using mapping signatures or other data indications to allocate each set of data to a respective failure condition where each of the virtual queues are assigned data based on the data category or failure condition.

With such an implementation, received data is mapped to virtual queues that are expected to fail together. Further, such implementations provide for automatic retries of failed virtual queues to detect repairs downstream while continuing to transmit high priority data over alternative virtual queues. After the detected fault is determined to be resolved, an automatic reprioritization of virtual queues may be performed. The disclosed systems and methods may be used in a variety of problem spaces, such as queue-based application models, management systems, communication systems, and data synchronization systems.

Figure 3:
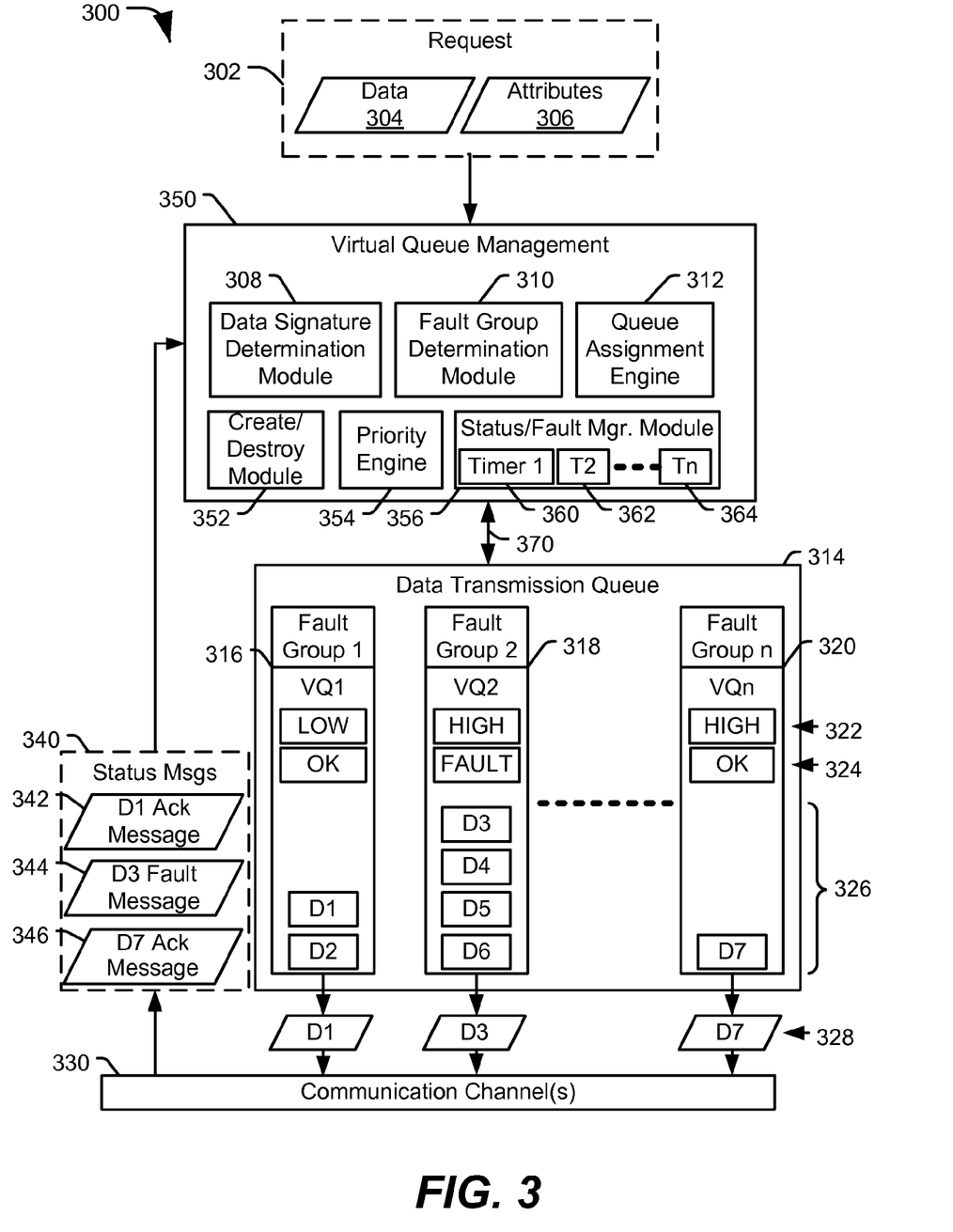
FIG. 3 is a block diagram of a particular embodiment of a computer system including a data transmission queue that may be used with the computer system environments of FIG. 1 or 2.

Referring to FIG. 3, a particular embodiment of a computer system 300 that may be used in a distributed computing environment is shown. The computer system 300 illustrates further details of an illustrative computer server that may be used in the distributed computer system environment, such as the operations management server 102 shown in FIG. 1, or the first computer system 210 or the second computer system 250 in the multi-hop computer system environment, as shown in FIG. 2. The computer system 300 illustrates further details of virtual queues and of data allocation into virtual queues using fault group data. The computer system 300 is coupled to a communication channel 330 and includes a data transmission queue 314 and a virtual queue management module 350. The data transmission queue 314 includes a plurality of representative virtual queues including a first virtual queue 316, a second virtual queue 318, and an Nth virtual queue 320 (where N is an integer greater than 2). Each of the virtual queues is associated with a respective fault group. For example, a first fault group having a first fault group identifier is associated with the first virtual queue 316, a second fault group having a second fault group identifier is associated with the second virtual queue 318, and an Nth fault group having an Nth fault group identifier is associated with the Nth virtual queue 320. Each of the virtual queues includes one or more data items 326 that have been allocated and/or assigned to the respective virtual queue. In addition, each of the virtual queues has a priority level 322 such that the set of virtual queues provides a priority queue communication mechanism. Further, each of the virtual queues has a fault condition element 324 to indicate their fault status. For example, the first virtual queue 316 is indicated to have a low priority and to have a non-fault condition indicating normal operation ('OK' in FIG. 3). The second virtual queue 318 has a high priority but has a current fault condition ('FAULT' in FIG. 3). The Nth virtual queue 320 is indicated to have a non-fault condition (i.e., normal operation) and to be at a high priority.

The virtual queue management module 350 includes a data signature determination module 308, a fault group determination module 310, a virtual queue creation/destruction module 352, a prioritization engine 354, and a status/fault manager module 356. The status/fault manager module 356 includes a plurality of retransmission timers 360, 362 and 364 associated with the virtual queues. The virtual queue management module 350 also includes a queue assignment engine 312.

During operation, the virtual queue management module 350 receives input, such as a data request 302 that includes a data item 304 and data attributes 306. The data signature determination module 308 extracts the data item 304 and produces a data signature that is used by the fault group determination module 310 to determine a fault group. The data signature may be based on the type of item, a destination, a priority, other internal flags or a hash value given by an application. The hash value can be configurable by a user or an application. In one example, a hash value is determined based on a rule identifier of a rule associated with the data 304. For example, a rule identifier of a data allocation rule or a distributed processing rule may be used to determine the hash value. The queue assignment engine 312 determines an assignment of the received data 304 into a selected virtual queue based on the determined fault group. The virtual queue management module 350 indicates the queue assignment to one of the plurality of virtual queues and provides a control signal 370 to the data transmission queue 314 based on the determined virtual queue assignment. The control signal 370 identifies a particular virtual queue for assignment of the received data 304.

The communication channel 330 is used to communicate data from one or more of the virtual queues 316, 318, and 320 to a receiving computer system. Representative data to be transmitted over the communication channel is indicated at 328. In addition, the communication channel 330 may receive response messages from a remote system, such as from a receiving computer system. The received response messages, such as status messages 340 are shown in FIG. 3. The status messages 340 may include acknowledge signals or fault indications. In the illustrative example shown, the status messages 340 include a first message 342, which is an acknowledge message with respect to a data item D1, a second message 344, which is a fault message with respect to a data item D3, and a third message 346, which is an acknowledge message with respect to a data item D7. The virtual queue management module 350 receives the status messages 340 and includes logic to process the received status messages 340 and to provide responsive control signals to the data transmission queue 314 based on the status messages 340 and based on the data signatures. For example, where the fault message 344 for data item D3 is received at the virtual queue management module 350, the virtual queue management module 350 may provide a control signal to indicate that the second virtual queue 318 has experienced a fault condition. Once the fault condition has been detected with respect to the second virtual queue 318 (based on detection of the second message 344 that indicates the fault event), the second virtual queue 318 may be paused, blocked, or de-prioritized with respect to the other virtual queues regarding future communications over the communication channel 330. To illustrate, when the second virtual queue 318 is experiencing a fault condition, data within the second virtual queue 318 is not transmitted or attempted transmissions occur less frequently than data in the other virtual queues. While a fault condition may be detected by receipt of a fault message, such as the second message 344, the fault condition may also be detected where a transmission has a timeout. In a particular example, a timeout fault condition may be detected if a positive acknowledgment is not received within 60 seconds after communication over the communication channel 330.

In addition, after detection of a fault condition where a particular virtual queue, such as the second virtual queue 318, is marked as re-prioritized due to a failure condition, a retransmission timeout value for reattempted transmission may be started. After the initial fault condition is detected, as further fault conditions are detected or as the size of the affected virtual queue (e.g. the second virtual queue 318) increases, the retransmission timeout value may be continuously increased, such as doubled up to a maximum value. The retransmission timeout value may be cleared upon detecting a remedy of the fault condition. For example, if an acknowledge signal is received after an attempted transmission, the virtual queue management module 350 detects that the prior fault condition has been remedied. The timeout value or the retransmission timeout value, in a particular embodiment, is slightly randomized to prevent all clients of a server or other data source from retrying transmission at exactly the same time. In a particular illustrative embodiment, the fault condition timeout and the retransmission timeout may be implemented using one or more individual timers.

In a particular embodiment, the virtual queues may be dynamically created and stored. For example, when a fault group determination for a data item is made, the virtual queue management module 350 checks to see if there is a virtual queue that the data item is to be assigned to. If there is no eligible virtual queue then one or more new virtual queues may be created dynamically. In one embodiment, when all data items have been removed from a particular virtual queue, the virtual queue is automatically deleted.

Figure 4:
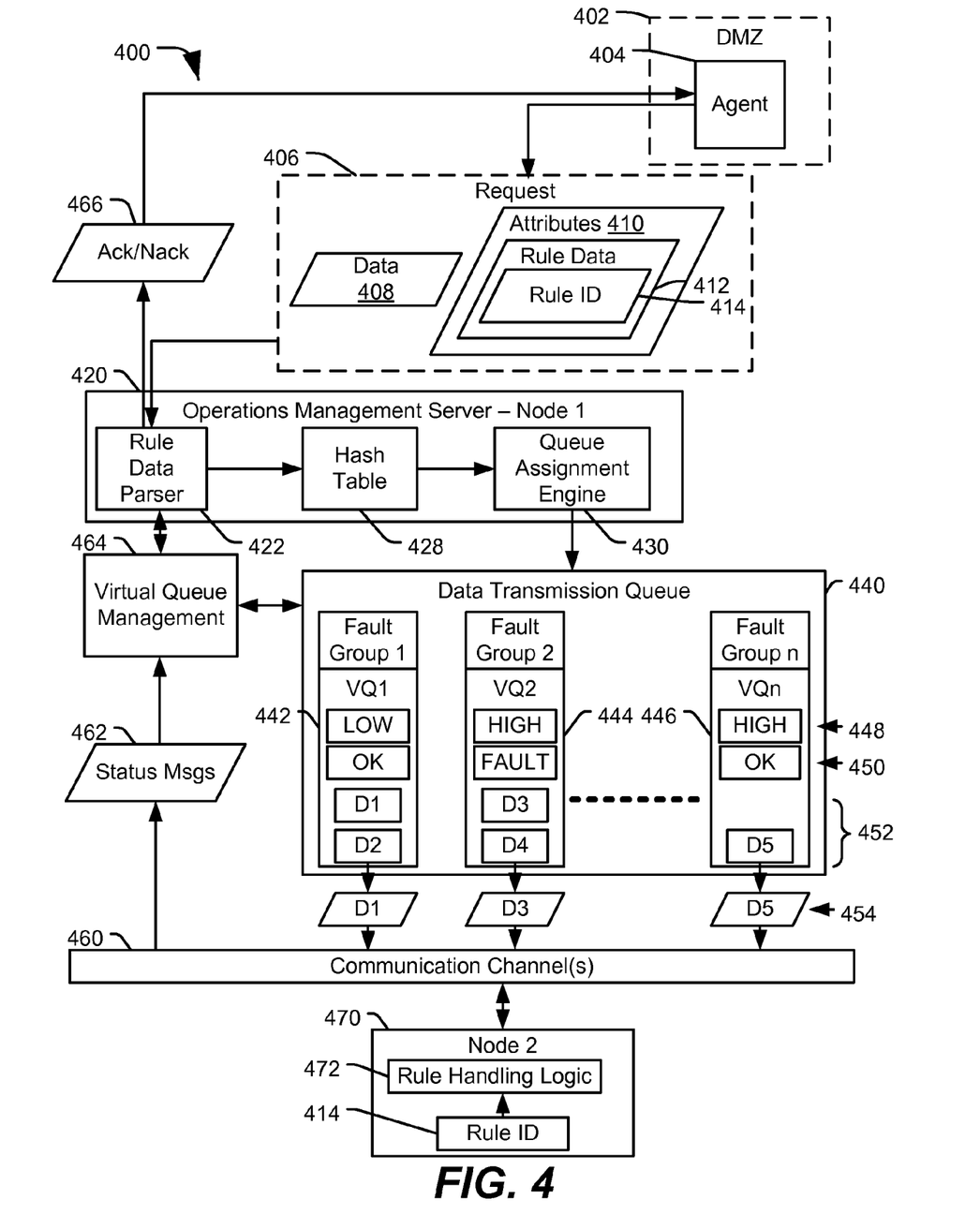
FIG. 4 is a block diagram of a second embodiment of a computer system including a data transmission queue that may be used with the computer system environments of FIG. 1 or 2.

Referring to FIG. 4, another illustrative embodiment of a computer system 400 is shown. The computer system 400 is a particular example of a computer server where data is allocated to virtual queues based on predicted fault grouping that is determined by a rule identifier (Rule ID) of the data. The computer system 400 may be used in the distributed computer system environment as in FIG. 1 or in the multi-hop environment as in FIG. 2. The computer system 400 includes an operations management server at a first node 420 and a representative second node 470. The first node 420 communicates data over a communication channel 460 to the second node 470. The first node 420 is coupled to (or includes) a data transmission queue 440 via a queue assignment engine 430. The first node 420 also includes a rule data parser 422 and an optional hash table 428. The data transmission queue 440 includes a plurality of virtual queues 442, 444 and 446. The data transmission queue 440 also includes priority value indicators 448, fault value indicators 450, and one or more data items 452. The data transmission queue 440 provides data 454 for communication over the communication channel 460 to the second node 470. The communication channel 460 also receives messages such as the indicated status messages 462, which may be provided to a virtual queue management module 464. The first node 420 also may provide a response signal, such as an acknowledge (ACK) or negative acknowledge (NACK) message 466 to an upstream element illustrated as an agent 404 in a demilitarized zone (DMZ) 402. In addition, the first node 420 may receive requests such as the illustrated request 406 from the DMZ agent 404. The request 406 may include a data item 408 and data attributes 410 including rule data 412 such as a rule identifier (Rule ID) 414. In a particular embodiment, the rule identifier (Rule ID) 414 uniquely designates a distributed rule that includes a first part of the rule associated with a first action to be performed at the computer 402 and a second part of the rule associated with a second action to be performed at the second node 470. The first action may be a data collection action and the second action may be a database storage action.

In a particular embodiment, the second node 470 is a computer system that is monitored by the operations management server at the first node 420. The second node 470 may include, for example, a data exchange server, a directory, a SQL server, a personal computer, a client device, an Internet information server, or any combination of the foregoing. Data received at the operations management server at the first node 420 may be consumed internally or may be distributed to other elements, such as to the second node 470 or to a particular workflow for handling. A workflow may be provided by Internet service vendors or stored in a data store, such as an external SQL database (not shown).

During operation, the request 406 is received at the rule data parser 422 of the first node 420. In response to receiving the request 406, the rule data parser 422 processes the request 406 and retrieves the rule identifier (Rule ID) 414, which is output to the hash table 428. The hash table 428 then converts the Rule ID value to a shortened hash value, such as a particular numeric or alphanumeric indicator, that is provided to a queue assignment module 430. The queue assignment module 430 uses the received hash value derived from the Rule ID to provide an index value for allocation of the data 408 to one of the available virtual queues. The data transmission queue 440, in response to the command from the queue assignment module 430, allocates the received data 408 to the selected virtual queue, or to a new queue if none of the available queues match the hash value.

The data transmission queue 440 regularly communicates data for each of the virtual queues over the communication channel 460 to the illustrated second node 470. The second node 470 includes rule handling logic 472 to take an action, such as to store the data 408 according to a second part of the rule identified by the Rule ID 414, where execution of the rule is distributed across the multiple computer systems 402, 420 and 470. Thus, data received at the second node 470 is processed according to the second part of the particular data rule identified by the Rule ID 414.

In the particular illustrative embodiment of FIG. 4, the Rule ID associated with each data item to be communicated is used to identify a fault group that is associated with each respective virtual queue. The system 400 of FIG. 4 uses the Rule ID to allocate data items into categories of data that are assigned to particular virtual queues so that similar predicted fault conditions with respect to similar data items are contained within a particular virtual queue.

Figure 5:
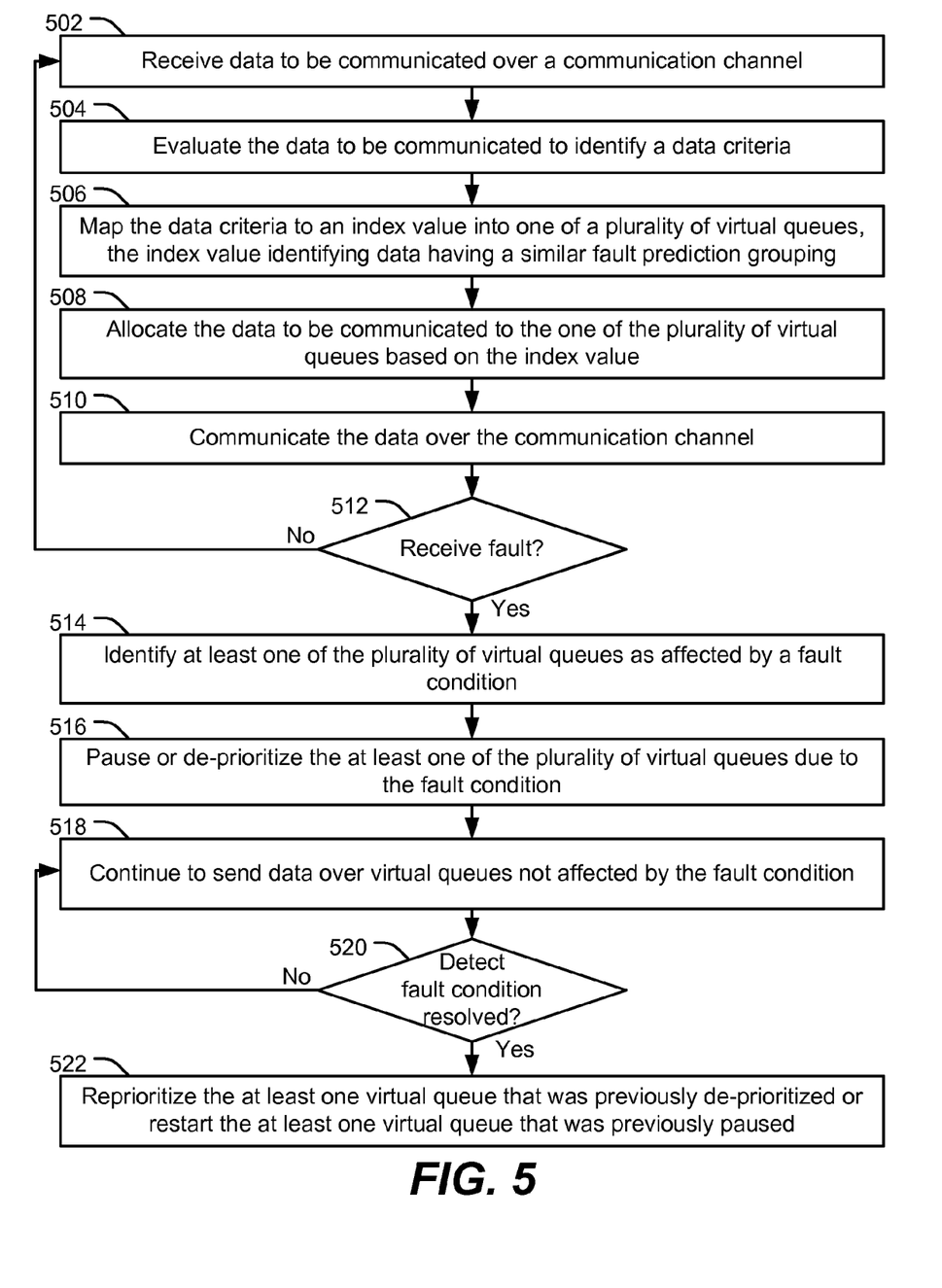
FIG. 5 is a flow diagram to illustrate a particular embodiment of a method of communicating data.

Referring to FIG. 5, a method of communicating data that may be used in connection with a distributed computing system is shown. The method of communicating data as described with reference to FIG. 5 may be used with any of the computer systems described above in connection with FIGS. 1-4. The method includes receiving data to be communicated over a communication channel, at 502, evaluating the data to be communicated to identify a particular data criteria, at 504, mapping the data criteria to an index value into one of a plurality of virtual queues at 506, and allocating the data to be communicated to one of the plurality of virtual queues based on the index value, as shown at 508. The index value identifies data having similar fault prediction groupings. The data allocated to the virtual queue is then communicated over the data communication channel, at 510. The data criteria in a particular embodiment may be a fault criteria, a rule based criteria, a data attribute, or another criteria used to allocate data to particular virtual queues. In a particular implementation, the data criteria and the associated index value are used to identify data sets having similar fault prediction groupings to improve system robustness and to enhance communication of data not affected by particular fault conditions.

After communicating the data over the communication channel, at 510, a fault condition message may be received or otherwise detected. Where a fault message is received or detected, as shown at decision block 512, processing continues at 514. Where a fault message is not received or detected, at 512, then processing of additional data for allocation to virtual queues is continued at 502.

Where fault messages or conditions are received or otherwise detected, at 514, the fault condition and the associated data is evaluated to identify at least one of the plurality of queues as affected by the fault condition. After the particular virtual queues have been identified, the affected virtual queues are blocked, paused, or de-prioritized due to the fault condition, at 516. Data communication continues using the virtual queues that are not affected by the fault condition, as shown at 518. At decision block 520, additional fault messages or non-fault messages are evaluated to detect whether the fault condition has been resolved. If the fault condition has not been resolved, processing continues at 518 for the unaffected virtual queues. Where the fault condition has been detected as resolved, processing continues at 522 where the affected virtual queues are re-prioritized if they were previously de-prioritized or are re-started if they were previously paused, such that normal operation of all virtual queues or at least the affected virtual queues is restored.

Figure 6:
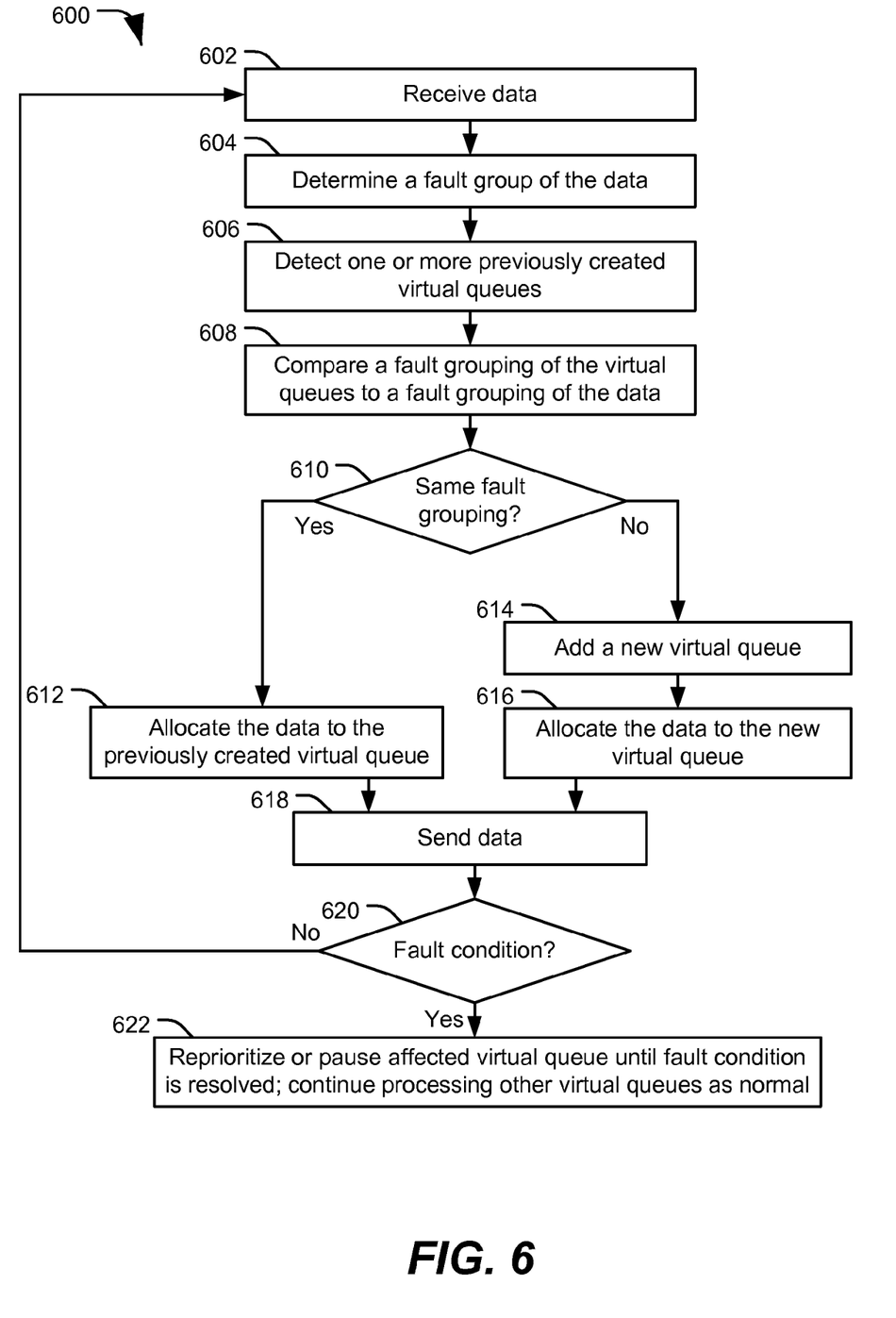
FIG. 6 is a flow diagram to illustrate a particular embodiment of a method of evaluating data with respect to virtual queues.

Referring to FIG. 6, a method of evaluating data with respect to virtual queues is shown. The method may be used with any of the computer systems described in connection with FIGS. 1-4. The method includes receiving data at 602, determining a fault group of the data, at 604, detecting one or more previously created virtual queues, at 606, and comparing a fault group of each of the virtual queues to a fault group of the data, at 608. Where the received data has a similar fault group or the same fault group as a prior virtual queue, as shown at 610, processing proceeds, at 612, where the received data is allocated to a previously created virtual queue having the same or similar fault group. However, where the same or similar fault group is not detected, at 610, then a new virtual queue is created, at 614, and the received data is allocated to the newly created virtual queue, at 616. Processing continues, at 618, where data allocated to either the previously created virtual queue or the new virtual queue is sent. Thus, data is allocated to one of the plurality of virtual queues and when a virtual queue does not exist, a new virtual queue may be created dynamically.

At 620, a fault condition is evaluated. Where no fault condition is detected, processing continues back at 602, as indicated above. Where a fault condition is detected, at 620, then a particular one or more virtual queues affected by the fault condition are either re-prioritized, blocked, or paused while processing for other virtual queues continues, as shown at 622.

In a particular embodiment, the data is associated with a set of attributes and a data signature is determined based on the set of attributes. The data signature value may be optionally mapped to a hash value to provide a shortened index value or the data signature value may be used without mapping to a hash value as a means of identifying a selected virtual queue. The data criteria used to identify a particular index value to a virtual queue may include a rule identifier when the data is associated with a particular rule. In addition, the received data may be from a prior stage computer server or other source and the data, after allocation to a particular virtual queue, may be forwarded to one or more receiving computer systems, such as a destination server or database. Referring to 622, in a particular illustrative embodiment, a first virtual queue is affected by a fault condition and may be re-prioritized or paused, while a second representative virtual queue is not affected by the fault condition and data allocated to the second virtual queue is communicated and processed normally after detection of the fault condition. After detecting that the fault condition has been resolved, the method may further include re-prioritizing the first virtual queue that was previously de-prioritized or re-starting the first virtual queue if it was previously paused or blocked.

While data allocation to virtual queues has been discussed in connection with data criteria rule identifiers or fault groups, it should be understood that data may be allocated to a virtual queue as determined by a particular application on an application-by-application basis or as otherwise defined by a particular application or user. In addition, the fault group or virtual queue allocation may be defined at least in part based on a data subtype or similar field or attribute of the data. In addition, where a first data item value is to be allocated and a previous data item has already been allocated to a first virtual queue and where the first data value and the previously allocated data value have a common fault group, both data values would be assigned to the same virtual queue. In addition, the first data value and the previously allocated data value may be tagged for processing by a common component of a receiving computer system, such as where both data values have a common rule or common destination.

The data may be allocated to a virtual queue based on a data signature associated with the data. In a particular embodiment, the data signature has a first data length and a hash value has a second data length that is smaller than the first data length. Thus, hashing may be used to reduce the data length of an index value to identify a particular virtual queue for data allocation.

Figure 7:
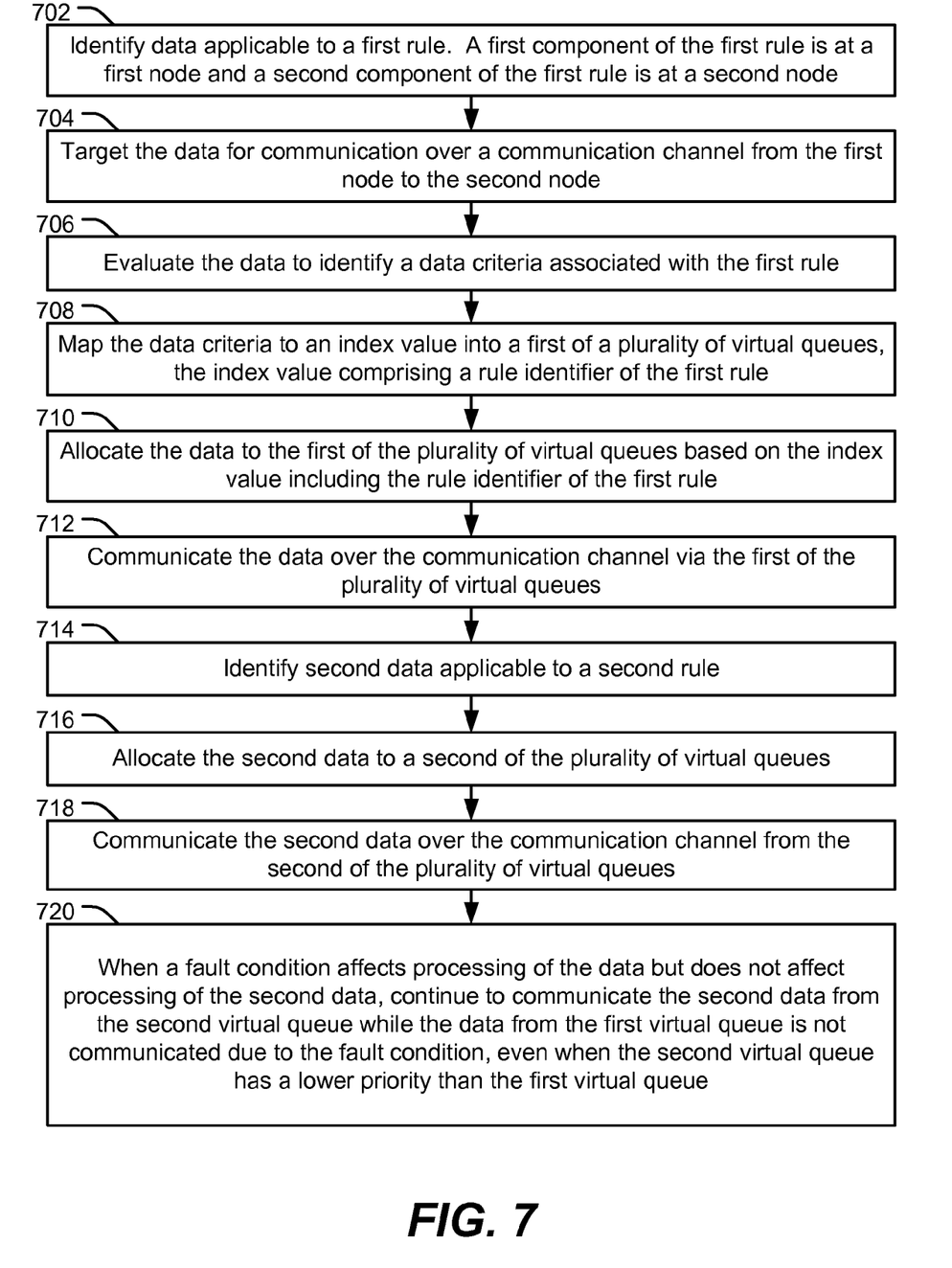
FIG. 7 is a flow diagram to illustrate a particular embodiment of a method of communicating data between nodes of a distributed computer system.

Referring to FIG. 7, a method of communicating data between nodes of a distributed rule-based computer system is shown. The method of communicating data may be used with any of the computer systems described in connection with FIGS. 1-4 above. The method includes identifying data applicable to a first rule or a first portion of a rule where a first component of the first rule is at a first node and a second component of the first rule is at a second node, at 702. The method further includes targeting the data for communication over a communication channel from the first node to the second node, at 704. The method further includes evaluating the data to identify data criteria associated with the first rule, at 706, and mapping the data criteria to an index value into a first of a plurality of virtual queues, where the index value includes a rule identifier of the first rule, as shown at 708. The method further includes allocating the data to the first of the plurality of virtual queues based on the index value that includes the rule identifier of the first rule, at 710, and communicating the data over the communication channel via the first of the plurality of virtual queues, as shown at 712. The method further includes identifying second data applicable to a second rule, at 714, and allocating the second data to a second of the plurality of virtual queues, at 716. The method further includes communicating the second data over the communication channel from the second of the plurality of the virtual queues, at 718.

The method further includes, upon detection of a fault condition where the fault condition affects the processing of the data but does not affect the processing of the second data, continuing to communicate the second data from the second virtual queue while the data over the first virtual queue is not communicated due to the fault condition, at 720. Even when the second virtual queue is at a lower priority than the first virtual queue, the second data temporarily has a higher priority value and communication of data in the second virtual queue continues over the communication channel while the first virtual queue data is temporarily de-prioritized, blocked, or paused during the fault condition.

The disclosed systems and methods of data communication using virtual queues increase resiliency to failures and improve data flow performance of distributed computer systems including those with priority queues. Distributed computing systems are useful in many applications including use within a corporate data network. In addition, a gateway system may be used to provide size limits of various virtual queues to actively manage data flow and responses to various fault elements over the entire system. Such implementations may allow data to be backed-up on a particular agent rather than overflowing a gateway server queue. The data allocated based on fault groupings are grouped together so that different failure modes end up in different virtual queues. For example, if data being received is being written to a file, it could be useful to separate out data being written to different drives. With an operations manager implementation, data may be separated based on different available data rules. Since the properties identifying the data can be large, a hash table may be used as an efficient way of tracking the identity of different virtual queues. With an operation manager implementation, the identity of a rule may be associated with a particular management pack as well as the particular rule name. The management pack and rule name may contain a long string and may be hashed to provide a shortened fixed length value.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communicating data, the method comprising:
   receiving data to be communicated over a communication channel;
   evaluating the data to be communicated to identify a data criteria;
   mapping the data criteria to an index value into a virtual queue of a plurality of virtual queues, the index value being associated with data having a similar fault prediction grouping, wherein communication of the data having the similar fault prediction grouping is predicted to fail under similar conditions;

allocating the data to be communicated to the virtual queue based on the index value;
communicating the data over the communication channel to a communication destination;
receiving a fault signal indicator indicative of a fault condition at the communication destination;
initializing a retransmission timer with a first value;
automatically retrying communication of the data to the communication destination responsive to expiration of the retransmission timer;
setting the retransmission timer to a second value that is greater than the first value in response to determining that the automatically retry is unsuccessful; and
in response to successful communication of the data to the communication destination, detecting that the fault condition is resolved,
wherein the index value is a hash value, wherein the data has a set of attributes, wherein a data signature is determined based on the set of attributes, and wherein the data signature is mapped to the hash value.

2. The method of claim 1, wherein the data is allocated to the virtual queue dynamically.

3. The method of claim 1, wherein the data criteria is a rule identifier and wherein the data includes rule data.

4. The method of claim 1, wherein the data is received from a remote computer server.

5. The method of claim 1, wherein at least a second virtual queue is not affected by the fault condition and wherein data allocated to the second virtual queue continues to be communicated after detection of the fault condition.

6. The method of claim 1, further comprising determining a common fault group of each set of data to be allocated to virtual queues on an application by application basis.

7. The method of claim 1, further comprising determining the fault prediction grouping based at least in part on a data subtype of the data.

8. The method of claim 1, further comprising detecting a previously created virtual queue including a second data value and allocating the data to the previously created virtual queue.

9. The method of claim 8, wherein the second data value and a first data value corresponding to the data have a common fault group.

10. The method of claim 9, wherein the first data value and the second data value are tagged for processing by a common component of a receiving computer system that receives the first data value and the data.

11. The method of claim 1, further comprising detecting at least one previously created virtual queue having a first fault group and adding a new virtual queue after determining that the data has a second fault group that is different than the first fault group.

12. The method of claim 1, wherein the second value is double the first value.

13. A method of communicating data between nodes of a distributed computer system, the method comprising:
identifying data applicable to a first rule having a rule identifier, wherein the first rule comprises a distributed rule that identifies a first action to be performed at a first node of a distributed computing system and a second action to be performed at a second node of the distributed computing system;
identifying second data applicable to a second rule;
targeting the data for communication over a communication channel from the first node to the second node;
evaluating a data request to identify the rule identifier;
mapping the rule identifier to an index value;
allocating the data to a first virtual queue of a plurality of virtual queues based on the index value;
allocating the second data to a second virtual queue of the plurality of virtual queues;
communicating the data over the communication channel to a communication destination from the first virtual queue;
communicating the second data over the communication channel to the communication destination from the second virtual queue,
receiving a fault signal indicator indicative of a fault condition at the communication destination;
initializing a retransmission timer with a first value;
automatically retrying communication of the data to the communication destination responsive to expiration of the retransmission timer;
setting the retransmission timer to a second value that is greater than the first value in response to determining that the automatic retry is unsuccessful; and
in response to successful communication of the data to the communication destination, detecting that the fault condition is resolved,
wherein the second virtual queue has a lower priority than the first virtual queue, wherein a fault condition at a communication destination affects processing of the data in the first virtual queue but does not affect processing of the second data in the second virtual queue, and wherein the second data continues to be communicated while the data in the first virtual queue is not communicated due to the fault condition, and
wherein the index value is a hash value, wherein the data has a set of attributes, wherein a data signature is determined based on the set of attributes, and wherein the data signature is mapped to the hash value.

14. The method of claim 13, wherein the first node or the second node comprises an operations management server, wherein the operations management server performs monitoring of an information technology environment including monitoring of other servers, clients, and applications, and wherein the operations management server performs monitoring of events and provides reports and alarms of detected error conditions and status conditions.

15. The method of claim 13, wherein the first action comprises a data collection action and wherein the second action comprises a database storage action.

16. A computer system comprising:
a processor;
a memory storing a data transmission queue including a plurality of virtual queues including a first virtual queue associated with a first fault group and a second virtual queue associated with a second fault group, wherein communication of data in a particular virtual queue and associated with a particular fault group is predicted to fail under similar conditions;
a communication channel communicatively coupled to the data transmission queue; and
a virtual queue management module executable by the processor to evaluate data to be communicated over the communication channel to a communication destination and to control assignment of the evaluated data with respect to at least one of the plurality of virtual queues within the data transmission queue, wherein the evaluated data is assigned based on a plurality of rules including at least one distributed rule that identifies a first action to be performed at the computing system and a second action to be performed at another computing system, wherein the virtual queue management module performs the steps of:
- receiving data to be communicated over a communication channel;
- evaluating the data to be communicated to identify a data criteria;
- mapping the data criteria to an index value into a virtual queue of a plurality of virtual queues, the index value being associated with data having a similar fault prediction grouping, wherein communication of the data having the similar fault prediction grouping is predicted to fail under similar conditions;
- allocating the data to be communicated to the virtual queue based on the index value;
- communicating the data over the communication channel to a communication destination;
- receiving a fault signal indicator indicative of a fault condition at the communication destination;
- initializing a retransmission timer with a first value;
- automatically retrying communication of the data to the communication destination responsive to expiration of the retransmission timer;
- setting the retransmission timer to a second value that is greater than the first value in response to determining that the automatic retry is unsuccessful; and
- in response to successful communication of the data to the communication destination, detecting that the fault condition is resolved.

17. The system of claim 16, wherein the data is evaluated by the virtual queue management module based on a rule identifier of a rule associated with the data to be communicated.

* * * * *